United States Patent [19]

Walther

[11] 4,327,922
[45] May 4, 1982

[54] REUSABLE SEALS WITH DOUBLE SHELL MOUNTINGS

[75] Inventor: William D. Walther, Kettering, Ohio

[73] Assignee: Dayton-Walther Corporation, Dayton, Ohio

[21] Appl. No.: 162,857

[22] Filed: Jun. 25, 1980

Related U.S. Application Data

[63] Continuation-in-part of Ser. No. 97,069, Nov. 23, 1979, abandoned.

[51] Int. Cl.³ .............................................. F16J 15/32
[52] U.S. Cl. ....................................... 277/37; 277/48; 277/50; 277/153; 277/184; 277/186
[58] Field of Search ................. 277/35, 37, 45, 47–49, 277/50, 51, 152, 153, 165, 178, 182–184, 186

[56] References Cited

U.S. PATENT DOCUMENTS

| 2,742,306 | 4/1956 | Kelso et al. | 277/184 X |
| 2,835,515 | 5/1958 | Solari | 277/38 |
| 3,064,982 | 11/1962 | Stephens | 277/95 |
| 3,114,558 | 12/1963 | Rhoads et al. | 277/47 X |
| 3,135,518 | 6/1964 | Carson et al. | 277/37 |
| 3,177,041 | 4/1965 | Isenbarger . | |
| 3,368,819 | 2/1968 | Otto | 277/37 X |
| 3,682,488 | 8/1972 | Matsushima | 277/36 |
| 3,685,841 | 8/1972 | Keller | 277/47 X |

FOREIGN PATENT DOCUMENTS 625918  7/1949  United Kingdom .................. 277/51

Primary Examiner—Robert S. Ward, Jr.
Attorney, Agent, or Firm—Biebel, French & Nauman

[57] ABSTRACT

Reusable seal assemblies for heavy duty truck or semitrailer wheels and axle assemblies. The reusable seal assemblies have an outer metal hub engaging shell formed with an outer generally axial surface which forms a clearance fit with the corresponding seal-receiving surface of the hub. The seals further have an axle engaging inner sheet metal shell formed with an inner surface which forms a clearance fit with the axle spindle. Each of the inner and outer shells are formed with annular recesses. These recesses are proportioned to receive square-cut static sealing rings. In one embodiment the annular recess formed in the outer shell may be provided with a radial inner portion which is tapered with respect to the adjacent surface of the hub, so that when an elastomer seal is received within the annular recess, the compression of the static seal between the recess and the hub causes the seal assembly to be biased inwardly into a seated position within the hub. In another embodiment, the annular recess formed in the inner shell is tapered.

11 Claims, 5 Drawing Figures

REUSABLE SEALS WITH DOUBLE SHELL MOUNTINGS

CROSS REFERENCE TO RELATED APPLICATION

This application is a continuation-in-part application of Ser. No. 97,069 filed Nov. 23, 1979, now abandoned.

BACKGROUND OF THE INVENTION

This invention relates to seals and more particularly to heavy duty seals for use with truck wheels, semi-trailer wheels and the like.

Typical heavy duty truck wheels and axle spindle assemblies are shown in Stephens, U.S. Pat. No. 3,064,982 issued Nov. 20, 1962 and Isenbarger, U.S. Pat. No. 3,177,041 issued Apr. 6, 1965. In each of these prior patents a wheel hub and spindle are shown in which the hub is adapted to contain a quantity of relatively light lubricating oil. The level of the lubricating oil may be observed by looking through a window formed in the hub cap. In each instance a single seal assembly between the hub and axle assembly is employed for retaining the lubricating oil liquid within the hub and for excluding dust, dirt and the like. From time to time it is necessary to remove the wheel from the axle for the purpose of inspecting or replacing the brakes, working on the anti-skid system, replacing the bearings or the like. The seals which are commonly employed have a metal-to-metal press fit on their inside and outside diameter, and the perfect seal between the outer body of the seal and the wheel hub on the one hand and between the inner body of the seal and the axle spindle on the other hand, is commonly destroyed or lost when the seal is pried out of position. Thus, it is customary in practice to replace the seal each time a wheel is removed.

There has been some effort to design axle seals which may be reused, and one such reusable seal is shown in Matsushima, U.S. Pat. No. 3,682,488 issued Aug. 8, 1972. However, the Matsushima seal has metal-to-metal contact between the seal and the axle spindle, thus requiring the seal to have a very close fluid-tight, metal-to-metal fit on the spindle. Obviously, any irregularity on the spindle surface or any damage to the inner seal shell would prevent its reuse.

SUMMARY OF THE INVENTION

The present invention is directed to improved reusable axle seal assemblies for heavy duty truck wheels and the like in which the inner and outer seal elements are formed as a loose or clearance fit respectively with the axle spindle and with the wheel hub. Low cost and highly effective lathe cut seal members are received within inwardly and outwardly opening grooves on the seal and form the fluid-tight fits. Thus, such seal assembly provides little or no resistance to installation or removal of the wheel, and may be reused. Further, the seal assembly of the present invention is capable of installation or removal without the use of special tools.

In one embodiment, the outer seal groove which accommodates a square cut seal to engage the sealing recess in the wheel hub is provided with an inwardly sloping taper or, in other words, a tapered lower or inner wall, which causes the seal to urge the entire seal assembly inwardly into seated relation within the annular hub recess. In another embodiment, the inner seal groove is provided with an inwardly sloping or tapered radially inner seal-receiving surface which causes the seal therein to urge the assembly into such seated relation. The running or wear surfaces of the seals of this invention are contained entirely within the seal assembly and neither the axle spindle nor the wheel hub is employed as a running surface.

It is accordingly an important object of this invention to provide reusable heavy duty truck wheel seals in which the metal-to-metal press fit is eliminated. The seals are free of any interference fit between the seal assembly and the wheel on the one hand and the spindle on the other hand. The seal assemblies employ elastomeric seal members, preferably square-cut seals, in suitable seal-receiving grooves.

A still further object of this invention is the provision of a reusable seal in which one or both of the static seal-retaining recesses is formed with a taper providing a biasing force tending to urge the seal assembly into a seated position in the hub.

By eliminating the press fit requirements, the seals of this invention have the advantage of eliminating an important cause of seal damage in their installation and removal. The seal assemblies of the present invention will thus be reusable merely by replacing the square cut rings, provided the seals have not otherwise failed internally, and no special installation or removal tools are required.

These and other objects and advantages of the invention will be apparent from the following description, the accompanying drawings, and the appended claims.

DESCRIPTION OF THE PREFERRED EMBODIMENTS

Figure 1:
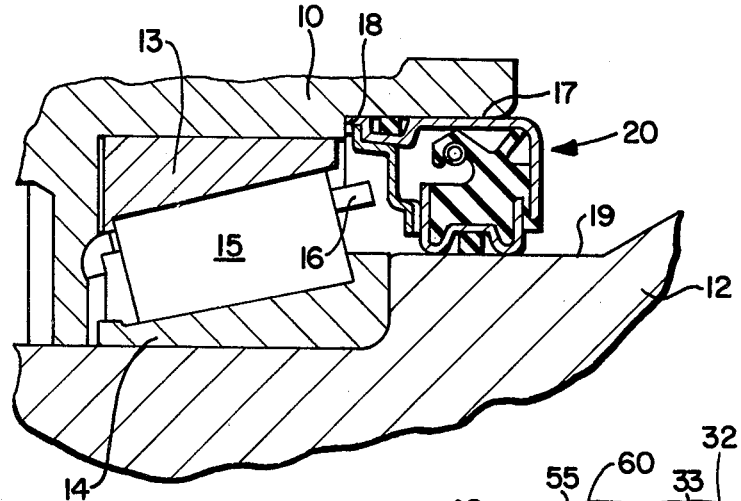
FIG. 1 is an enlarged sectional view through a wheel and axle assembly showing the seal assembly of this invention.

The invention is illustrated in FIG. 1 as applied to a wheel hub 10 mounted on an axle spindle 12. The hub 10 receives, in a bearing recess, a conventional roller bearing which includes an outer race 13 which is pressed into the bearing bore, and an inner race 14 mounted on the spindle 12. The rollers 15 are captured therebetween and retained by a conventional bearing cage 16.

Figure 2:
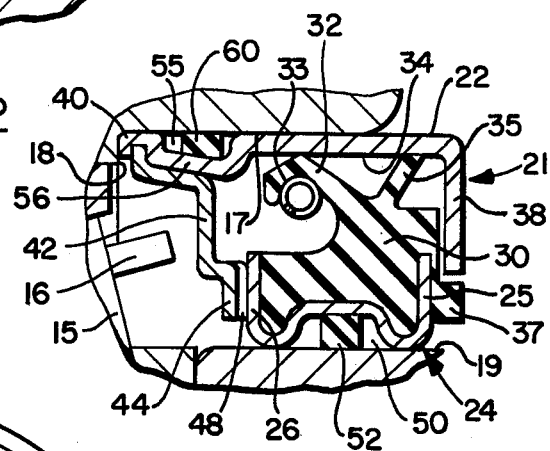
FIG. 2 is a fragmentary section similar to FIG. 1, but on an enlarged scale to show the details of the seal assembly.

The wheel hub includes an axial seal-receiving recess or surface 17 terminating at a radial abutment or seal seating wall 18 (FIG. 2). The axle spindle 12 also has an axially extending seal-receiving cylindrical surface 19.

A preferred embodiment a of reusable seal assembly of the present invention is illustrated generally at 20 in FIG. 1. Reference may be had to FIG. 2 in which the details of the seal assembly are shown in somewhat enlarged relation. Thus, the seal assembly 20 includes a stamped or formed outer sheet metal shell or ring 21 which is generally L-shaped in section, and which has an outer axial surface 22 adapted to form a clearance fit with the seal-receiving surface 17 of the hub 10. The seal assembly 20 further includes an inner generally U-shaped sheet metal shell or ring 24 with upwardly turned spaced apart ends 25 and 26 adapted to be received within the axial dimensions of the outer shell 21. The inner radius of the inner shell 24 is adapted to form a clearance fit with the surface 19 of the axle spindle 12.

The inner ring, between the upstanding ends 25 and 26, supports a molded elastomer seal body 30. The seal body 30 includes an outwardly extending primary running or sealing lip 32 which is supported on a conventional garter spring 33, and is positioned in running engagement with the adjacent inside planar surface 34 of the outer shell 21. The seal body 30 further includes a somewhat rearwardly and upwardly extending secondary dust seal 35 also in engagement with the surface 34. A portion of the body 30 extends downwardly over the outer wall 25 as indicated at 37 in immediate underlying relation to the rear radial wall 38 of the outer shell 21 to form a labyrinth type seal to prevent the intrusion of dust and other foreign particles into the interior of the seal assembly.

Figure 3:
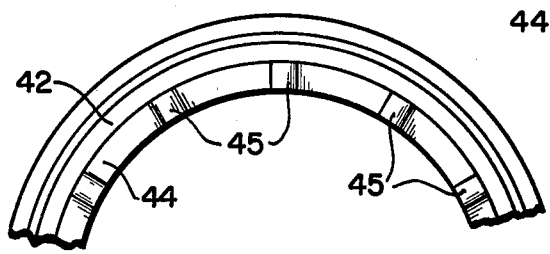
FIG. 3 is a partially broken away end elevation of the retainer ring member used with the seal of this invention.

The forward end of the outer shell 21 is crimped inwardly as indicated at 40 in FIG. 2 to receive and support an annular ring-like abutment member 42. The member 42 forms a forward closure for the interior of the seal and has a lower annular lip 44 which is dimpled as indicated at 45 in FIG. 3 so that the major portion of the lip 44 is in close running engagement with the outside surface of the forward wall 26. The dimples 45 define small radially extending openings 48 into the interior of the seal to prevent a large quantity of oil from being trapped within the seal which, in use, could overheat and damage the seal. Also, the dimples 45 defining the openings 48 conversely permit a small quantity of the lubricating oil to find its way into the interior of the seal, so that the seal remains lubricated.

The abutment member 42 also provides the function of temporarily retaining the bearing in place on the wheel 10 during assembly and prior to the bearing being piloted onto the axle 12. Further, the member 42 effectively captures and retains the assembled position of the body 30 and the inner shell 24 within the confines of the outer shell 21 of the seal prior to the assembly of the seal on the axle and wheel combination.

Since the inner and outer shells are formed with a clearance fit on their respective surfaces, these shells are not pressed into position in order to form a fluid-tight fit. Rather, static sealing means are provided between the shells and their respective seating surfaces. For this purpose, the inner shell 24 is provided with an annular inwardly opening seal-receiving recess 50 to receive a square or lathe cut elastomer sealing ring 52. The ring 52 is somewhat compressed in use and forms an effective fluid-tight seal between the surface 19 of the axle spindle 12 and the shell 24.

The forward end of the outer shell 21 is axially extended beyond the elastomer lip 32 and defines an outwardly opening static seal-receiving recess 55. The inner wall 56 defining the recess 55 is tapered in a direction so that the wall inclines inwardly with increasing distance from the bearing seating surface or wall 18. This taper may be in the order of approximately 7° although the exact degree of the taper is not critical. Another square cut elastomer sealing ring 60 is received within the outwardly opening groove 55 and forms a static fluid-tight seal between the outer shell 21 and the surface 17 of the hub. The use of lathe or square cut elastomer sealing rings is preferred by reason of their effectiveness and low cost, although O-rings or other types of sealing rings may be used.

The tapered or lower or inner wall 56 of the shell 21 differentially compresses the seal 60. There thus results a net force on the shell 21 tending to bias or urge the entire seal assembly 20 into forward or seated engagement with the surface 18, and resists the movement of the seal assembly 20 outwardly of this seated position.

By providing a clearance fit between the respective shells of the seal and the surfaces of the axle and wheel, the metal-to-metal press fit is eliminated. Since the press fit is eliminated, the seal assembly 20 is not deformed or destroyed when the wheel 10 is removed from the axle spindle 12 for routine maintenance or service. It is only necessary to replace the static seals 52 and 60 to assure integrity of the static seals between the seal assembly 20 and the relative parts, and the seal assembly may thus be reused as long as it is functioning properly. Further, the seal assembly 20 of this invention may be installed or removed without the necessity of employing special tools.

In the manufacture of the seal assembly, it should be noted that it is necessary to interfit the inner shell 24 within the outer shell 21 after the elastomer body 30 has been molded in place. During the interfitting, it is necessary for the primary sealing lip 32 with the garter ring 33 assembled, to be deflected inwardly in order to clear the inward indentation defined by the recess 55 and the wall 56. For this purpose, the inwardly inclined taper, previously described in relation to the biasing effect which it provides as urging the seal into its assembled and seated position, also has the advantageous function of providing an inner guiding surface over which the primary sealing lip 32 moves during assembly to its running position as shown in FIG. 2.

Normally, the seal assembly 20 will be assembled into the recess defined in the wheel hub into the approximate position shown in FIG. 1. Thereafter the wheel with the bearing being retained therein will be assembled on the axle spindle 12 and the ring member 42, prior to such assembly, will serve to prevent inadvertent dislodgment of the bearing. The rings 52 and 60 are not subject to any rotational movement on their respective seats and will assure a fluid-tight seal throughout the life of the assembly. The elimination of the necessity for metal-to-metal sealing also eliminates the possibility of initial damage to the seal and the seat during initial assembly and during replacement and thus eliminates an important cause of premature seal failure.

Figure 4:
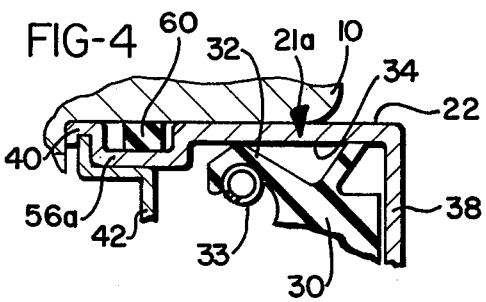
FIG. 4 is a partial sectional view showing a modified form of the outer seal shell.
Figure 5:
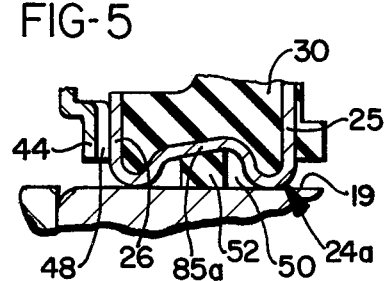
FIG. 5 is a partial sectional view showing a modified form of the inner seal shell.

It is not necessary to form the inner or lower wall 56 of the outer shell 21 with a taper in order to obtain and enjoy most of the advantages of this invention. Thus, as illustrated in FIG. 4, a modified form of the shell 21a is illustrated in which the radially inner or bottom wall 56a is formed parallel to the adjacent surface 17 of the hub to received the square cut ring 60. This arrangement may be preferred either by reason of its lower cost of manufacture, in instances where the net inwardly biasing force tending to seat the seal is not required to retain the seal assembly in place. Further, the embodiment of FIG. 4 may be used with the alternative embodiment of FIG. 5. In FIG. 5, a modified form of the inner shell 24a at the groove 50 is provided with a tapered or sloping radially inner seal receiving surface 85a, which surface tapers inwardly in a direction remote from the seating surface of the seal assembly. When the static seal 52 is compressed in the groove 50 against the surface 85a, a force is applied to the shell 24a tending to urge the shell and the seal assembly in a direction toward the seating surface on the hub, essentially in the same manner as has been described with the tapered wall 56 formed in the outer shell 21, described in connection with the embodiment of FIGS. 1 and 2.

While the forms of apparatus herein described constitute preferred embodiments of this invention, it it to be understood that the invention is not limited to these precise forms of apparatus, and that changes may be made therein without departing from the scope of the invention.

What is claimed is:

1. An improved reusable axle seal assembly for a wheel and axle assembly having a wheel bearing in which the wheel hub is formed with an inwardly opening seal-receiving axial surface terminating in an annular seal stop ledge or seat, and in which the axle spindle is similarly formed with an axially extending seal engaging surface in inwardly spaced relation to the corresponding surface of the hub, comprising:
    an outer metal hub engaging shell having an outer generally axial surface forming a clearance fit with the corresponding hub seal-receiving surface,
    an axle supported inner sheet metal shell having an inner surface which also forms a clearance fit with the spindle seal engaging surface, said inner shell having radially outwardly turned ends and having an axial length less than that of said outer shell,
    a sealing elastomer mounted on said inner shell between said outwardly turned ends and having an operable lip positioned in running engagement with an inside surface of said outer shell,
    said outer shell having means therein defining an outwardly opening elastomer ring-receiving recess positioned at a region axially inwardly of the region of running engagement of said lip with said inside surface thereof,
    said outer ring recess being adapted to receive a first annular elastomer static seal thereon for engagement with the seal-receiving surface of said hub, and
    said inner shell having means defining an annular inwardly opening seal-receiving recess between said ends adopted to receive a second elastomer static seal between said inner shell and said spindle seal engaging surface.

2. The reusable seal assembly of claim 1 further comprising a sheet metal ring member positioned in generally depending relation from said outer sheet metal shell and having a radial portion in axially spaced relation to said inner shell and forming an outside abutment for retaining the wheel bearing in place during assembly of the wheel hub on the axle.

3. The reusable seal assembly of claim 2 further having means defining openings between said ring member and said inner shell for the escape from the interior of said seal assembly of accumulated oil.

4. The reusable seal assembly of claim 1 in which the elastomer ring-receiving recess defined by at least one of said inner and outer shells is provided with an inner surface which is tapered with respect to the axis of the axle, so that when the corresponding elastomer seal is received therein, the compression of such seal within such recess against the tapered surface causes the seal assembly to be biased into seated position against said ledge.

5. The assembly of claim 4 in which said one shell comprises said outer shell.

6. The assembly of claim 4 in which said one shell comprises said inner shell.

7. A reusable seal assembly for sealing the lubricating fluid between the truck wheel hub and a truck axle, comprising:
    an outer sheet metal shell adapted to be mounted within a seal-receiving recess of the wheel,
    an inner sheet metal shell adapted to be received on the axle,
    rotating elastomer seal means between said inner and outer shells forming a running seal therebetween,
    means on said inner shell defining an inwardly opening, annular groove adapted to receive a static elastomer sealing member for forming a fluid-tight seal between the inner shell and the axle, and
    means on said outer shell defining an outwardly opening annular groove adapted to receive an annular static elastomer sealing member for forming a fluid-tight seal between said outer shell and the wheel hub, the radial inner wall portion of said outer shell defining said groove being tapered so that compression of the elastomer sealing ring between said groove tapered wall portion and said wheel tends to urge said seal assembly inwardly toward said wheel into a seated position.

8. An improved reusable axle seal assembly for a wheel and axle in which the wheel hub is formed with an inwardly opening seal-receiving axial recess terminating in an annular seal stop ledge or seat, and in which the axle spindle is similarly formed with an axially extending seal engaging surface in inwardly spaced relation to the corresponding surface of the hub, comprising:
    an outer metal hub-engaging shell having an outer generally axial surface forming a clearance fit with the corresponding hub surface,
    an axle engaging inner sheet metal shell having an inner surface which forms a clearance fit with the spindle seal engaging surface,
    a sealing elastomer mounted on one of said shells and having an operable lip positioned in running engagement with an inside surface of the other of said shells,
    said outer shell having means therein defining an outwardly opening elastomer ring-receiving recess, said outer ring recess being adapted to receive an annular square cut elastomer static sealing ring thereon for engagement with the seal-receiving surface of said hub,
    said inner shell also having means defining an annular inwardly opening seal-receiving recess between said ends for receiving a second square cut elastomer static sealing ring between said inner shell and said spindle surface.

9. A reusable seal assembly for sealing the lubricating fluid between the truck wheel hub and a truck axle, comprising an outer shell member adapted to be mounted within a seal-receiving recess of the wheel and forming a clearance fit therewith, an inner shell member adapted to be received on the axle and forming a clearance fit therewith, rotating elastomer seal means between said inner and outer shell members forming a running seal therebetween, means on said inner shell member defining an inwardly opening, annular groove adapted to receive an annular static elastomer seal for forming a fluid-tight seal between the inner shell member and the axle, and means on said outer shell member defining an outwardly opening annular groove adapted to receive an annular static elastomer seal member for forming a fluid-tight seal between said outer shell member and the wheel hub.

10. The seal assembly of claim 9 in which said annular groove formed in said outer shell member is provided with a tapered radially inner seal-receiving surface.

11. The seal assembly of claim 9 in which said annular groove formed on said inner shell member is provided with a tapered radially inner seal-receiving surface.

* * * * *